United States Patent
Compton et al.

(10) Patent No.: US 8,559,129 B2
(45) Date of Patent: Oct. 15, 2013

(54) PASS-THROUGH ACCESSOR COMPRISING A FIXTURING APPARATUS FOR STORING A PLURALITY OF PORTABLE DATA STORAGE CASSETTES

(75) Inventors: Matthew Charles Compton, Durham, NC (US); Louis Daniel Echevarria, Tucson, AZ (US); Stefan Lehmann, Tucson, AZ (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 12/243,132

(22) Filed: Oct. 1, 2008

(65) Prior Publication Data

US 2010/0080091 A1    Apr. 1, 2010

(51) Int. Cl.
*G11B 15/68*    (2006.01)

(52) U.S. Cl.
CPC .......... *G11B 15/6835* (2013.01); *G11B 15/682* (2013.01)
USPC .......... 360/92.1; 414/280; 414/277; 414/278; 414/22.01; 360/91

(58) Field of Classification Search
CPC . G11B 15/682; G11B 15/6835; G11B 17/225
USPC ............ 369/24.01, 30.01, 30.03, 30.06, 30.1, 369/30.28, 30.31, 30.34, 30.43, 30.45, 369/30.49, 30.55, 30.57; 414/222.01, 414/331.04, 331.08, 331.14, 331.16, 459, 414/460, 751.1, 814; G9B/17.041; 360/91, 360/92.1
See application file for complete search history.

(56) References Cited

U.S. PATENT DOCUMENTS

| | | | | |
|---|---|---|---|---|
| 3,381,833 A | * | 5/1968 | Gordon | 414/459 |
| 4,551,059 A | * | 11/1985 | Petoia | 414/459 |
| 5,004,393 A | * | 4/1991 | Lunka et al. | 414/331.16 |
| 5,036,503 A | * | 7/1991 | Tomita | 369/30.43 |
| 5,392,266 A | | 2/1995 | Kobayashi et al. | |
| 5,460,476 A | * | 10/1995 | Gazza | 414/800 |
| 5,601,391 A | * | 2/1997 | Gazza | 414/280 |
| 5,610,882 A | * | 3/1997 | Dang | 369/30.43 |
| 5,622,470 A | | 4/1997 | Schaefer et al. | |
| 5,956,301 A | * | 9/1999 | Dimitri et al. | 369/30.31 |
| 5,970,030 A | * | 10/1999 | Dimitri et al. | 369/30.46 |
| 6,064,544 A | * | 5/2000 | Wada | 360/92.1 |
| 6,493,604 B1 | | 12/2002 | Kappel et al. | |
| 6,729,825 B1 | | 5/2004 | Saliba et al. | |
| 6,781,789 B2 | * | 8/2004 | Ostwald | 360/92.1 |
| 6,904,005 B2 | * | 6/2005 | Emberty et al. | 369/30.31 |
| 6,922,307 B2 | * | 7/2005 | Ostwald et al. | 360/92.1 |
| 6,987,633 B2 | * | 1/2006 | Hutchins | 360/67 |
| 7,212,470 B2 | * | 5/2007 | Dimitri et | 369/30.2 |
| 7,463,488 B2 | * | 12/2008 | Emberty et al. | 361/717 |
| 7,635,246 B2 | * | 12/2009 | Neeper et al. | 414/280 |

(Continued)

*Primary Examiner* — Saul Rodriguez
*Assistant Examiner* — Brendan Tighe
(74) *Attorney, Agent, or Firm* — Dale F. Regelman; Quarles & Brady LLP (57) ABSTRACT

A pass-through accessor comprising a fixturing apparatus that can store a plurality of portable data storage cassettes. The pass-through accessor comprises a moveable gripper assembly comprising a plurality of gripping members. The gripper assembly releaseably attaches to a portable data storage cassette disposed in a storage slot, pulls that portable data storage cassette outwardly from the storage slot, and releaseably attaches that portable data storage cassette to one of a plurality of fixturing assemblies disposed on the fixturing apparatus.

12 Claims, 12 Drawing Sheets

(56) References Cited

U.S. PATENT DOCUMENTS

2002/0172580 A1* 11/2002 Mueller et al. ........... 414/331.14
2002/0186641 A1* 12/2002 Dimitri et al. ................ 369/100
2003/0171844 A1* 9/2003 Dimitri et al. ................ 700/214
2004/0126209 A1* 7/2004 Warhurst et al. .............. 414/279
2005/0171633 A1* 8/2005 Inch et al. ..................... 700/214

* cited by examiner

PASS-THROUGH ACCESSOR COMPRISING A FIXTURING APPARATUS FOR STORING A PLURALITY OF PORTABLE DATA STORAGE CASSETTES

FIELD OF THE INVENTION

This invention relates to a pass-through accessor comprising a fixturing apparatus for storing a plurality of portable data storage cassettes.

BACKGROUND OF THE INVENTION

Computing devices generate information. It is known in the art to store such information using a plurality of data storage cassettes disposed in an automated data storage library comprising a plurality of storage slots. Certain deep cell storage slots are capable of housing a plurality of portable data storage cassettes.

SUMMARY OF THE INVENTION

Applicants' invention comprises a pass-through accessor comprising a fixturing apparatus that can store a plurality of portable data storage cassettes. Applicants' pass-through accessor comprises a moveable gripper assembly comprising a plurality of gripping members. Applicants' gripper assembly releaseably attaches to a portable data storage cassette disposed in a storage slot, pulls that portable data storage cassette outwardly from the storage slot, moves that portable data storage cassette through a housing, and releaseably attaches that portable data storage cassette to one of a plurality of fixturing assemblies disposed on the fixturing apparatus.

Applicants' invention further comprises a data storage library comprising a plurality of deep cell storage slots, and a plurality of portable data storage cassettes removeably disposed in at least one of the plurality of deep cell storage slots. Applicants' data storage library further comprises Applicants' pass-through accessor.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
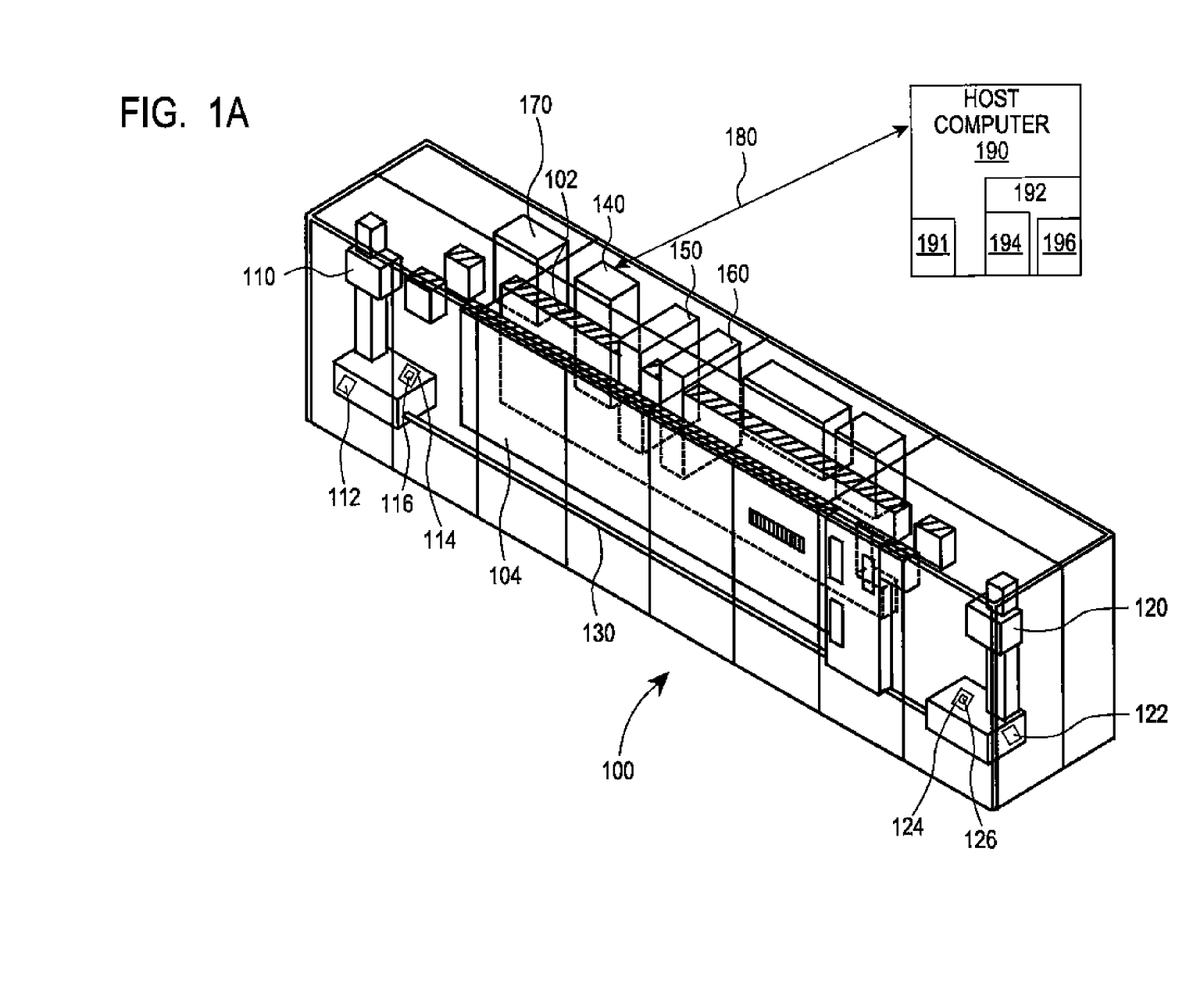
FIG. 1A is a perspective view illustrating an embodiment of Applicants' data storage library.

FIG. 1A shows data storage system 100. System 100 includes storage controller 140, data drives 150 and 160, and DASD 170. System 100 further includes a plurality of portable data storage cassettes removeably disposed in a plurality of storage slots disposed in first storage wall 102 and/or second storage wall 104.

The plurality of portable data storage cassettes removeably disposed within Applicants' data storage system each comprise an information storage medium disposed therein. In the illustrated embodiment of FIG. 1B, each portable data storage cassette 180 comprises a housing 181 and an information storage medium 185 disposed within housing. 181. In certain embodiments, the information storage medium 185 is removeably disposed within housing 181. In the illustrated embodiment of FIG. 1B, housing 181 is formed to include grooves 183 and 184 formed in side 182. In other embodiments, Applicants' housing 181 is formed to include a plurality of fixturing apertures extending inwardly, wherein a plurality of fixturing apertures replace each of the two fixturing aperture/grooves.

Figure 1B:
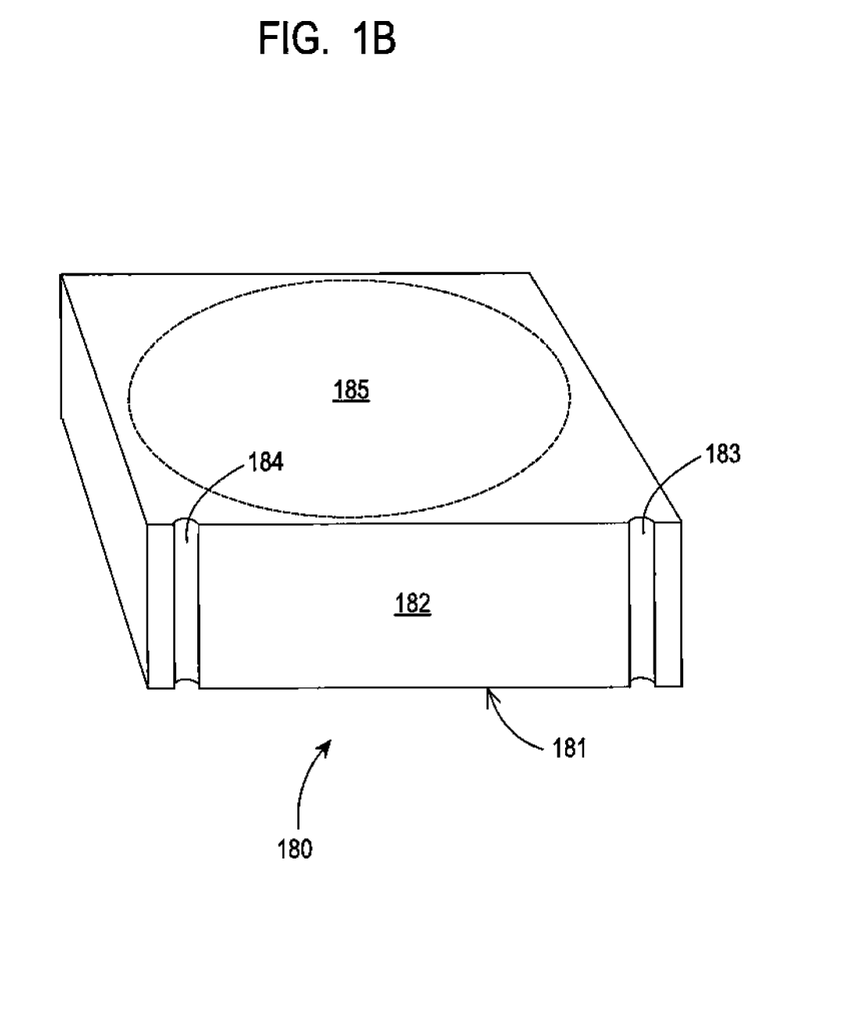
FIG. 1B is a perspective view illustrating Applicants' portable data storage cassette.

In certain embodiments, the plurality of portable data storage cassettes 180 removeably disposed within Applicants' data storage system each comprise a magnetic tape data storage medium 185. In certain embodiments, the plurality of portable data storage cassettes 180 removeably disposed within Applicants' data storage system each comprise an optical storage medium 185 disposed therein. In certain embodiments, the plurality of portable data storage cassettes 180 removeably disposed within Applicants' data storage system each comprise an electronic storage medium 185 disposed therein. In certain embodiments, the plurality of portable data storage cassettes 180 removeably disposed within Applicants' data storage system each comprise a holographic storage medium 185 disposed therein.

Data storage library 100 further comprises at least one pass-through accessor 110/120 for transporting a specified portable data storage cassette between a storage slot disposed in storage wall 102/104 and data drive 150 or 160. Pass-through accessors 110 and 120 are moveably disposed along rail 130.

Figure 2A:
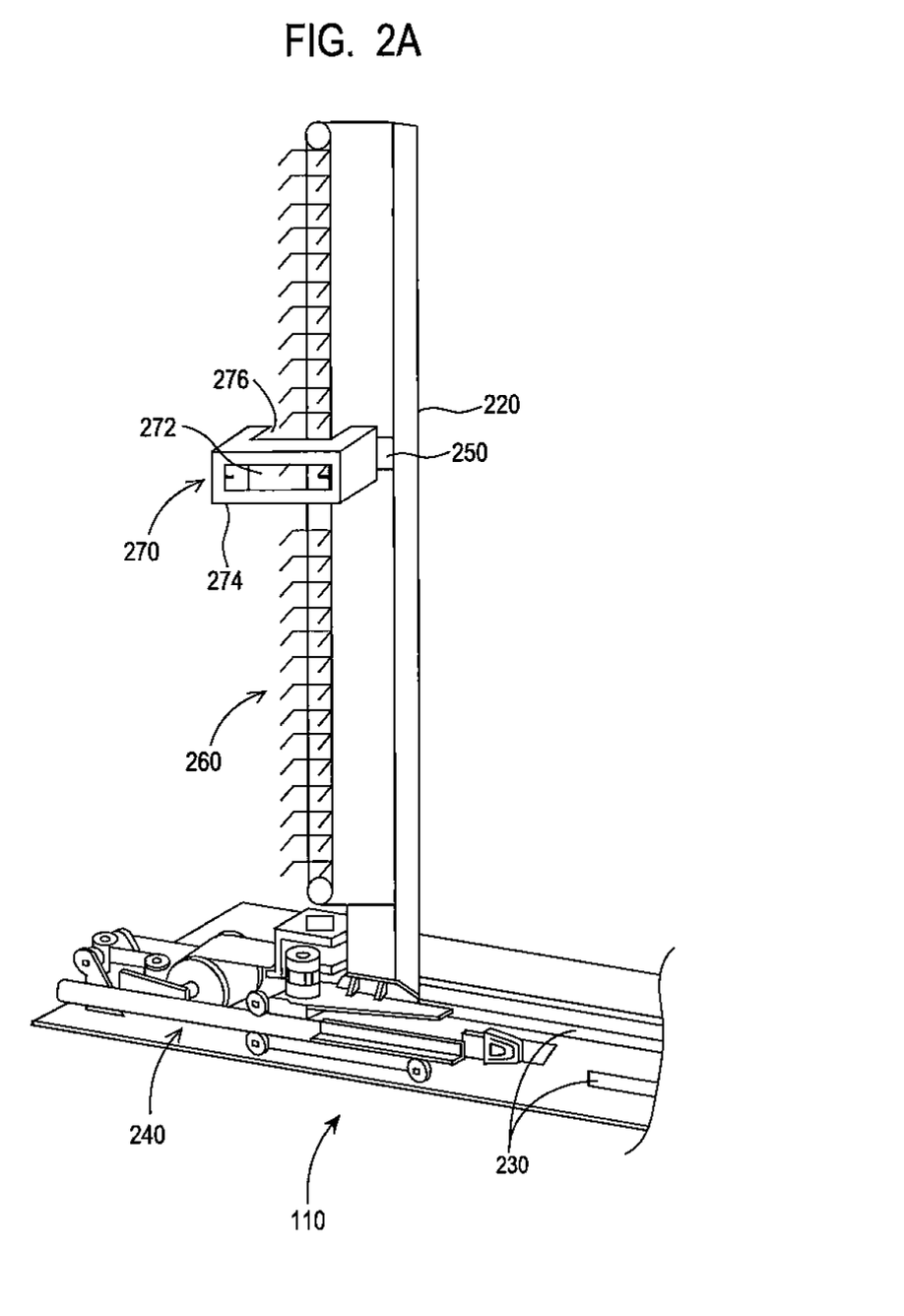
FIG. 2A is a perspective view illustrating Applicants' pass-through accessor moveably disposed in the data storage library of FIG. 1A, wherein a fixturing apparatus is shown in a first orientation.
Figure 2B:
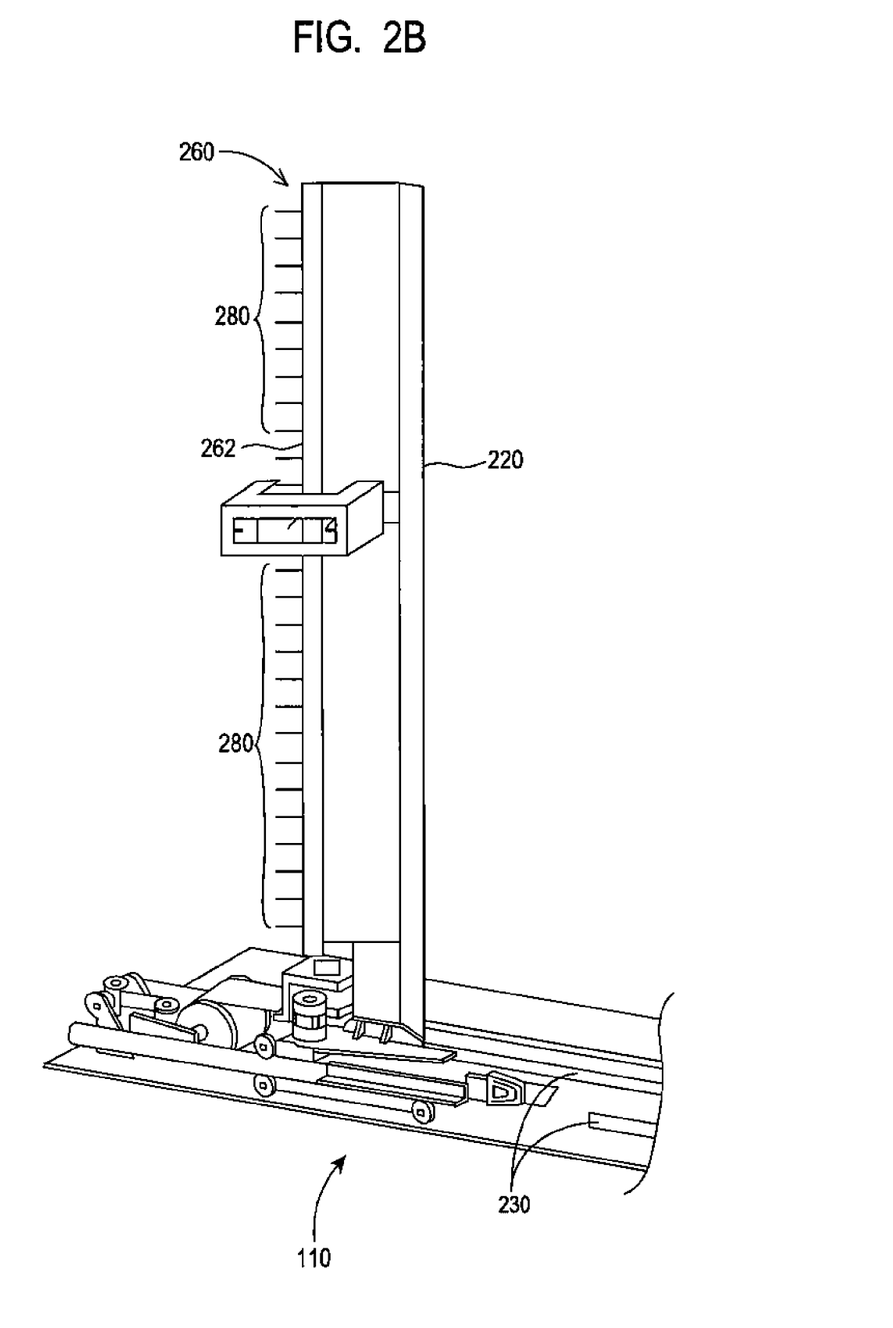
FIG. 2B illustrates the pass-through accessor of FIG. 2A wherein a fixturing apparatus is shown in a second orientation.

Referring now to FIGS. 1A, 2A, and 2B, Applicants' pass-through accessors 110 and 120 each comprise a vertical pillar 220, a lifting servo section 250 moveably disposed on pillar 220, a fixturing apparatus 260 moveably and rotationally attached to vertical pillar 220, and housing 270 disposed on lifting servo section 250. In the illustrated embodiment of FIGS. 2A and 2B, housing 270 comprises a "U-shape" defined by front end 272 (FIGS. 2A, 2B, 2C) and rear end 276. Front end 272 (FIGS. 2A, 2B, 2C) is formed to include aperture 272 (FIGS. 2A, 2B, 2C) extending therethrough.

Fixturing apparatus 260 comprises a plurality of fixturing assemblies 280 attached to a fixturing surface 262 and extending outwardly therefrom. Fixturing apparatus 260 and gripper 270 are rotationally attached to vertical pillar 220. Fixturing apparatus and gripper 270 can be rotated to face plurality of storage slots 102 or plurality of storage slots 104.

In the illustrated embodiment of FIG. 1A, data storage system 100 is in communication with host computer 190. As a general matter, host computer 190 comprises a computing device, such as a mainframe, personal computer, workstation, and combinations thereof, including an operating system 194 such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In the illustrated embodiment of FIG. 1A, host computer 190 further comprises instructions 196 encoded in a computer readable medium 192, wherein those instructions comprise computer readable program code to implement Applicants' method using Applicants' pass-through accessor.

Pass-through accessor 110 or 120 can receive a signal from host computer 190 designating one of the plurality of portable data storage cassettes, retrieve that designated portable data storage cassette from a storage slot, transport that designated portable data storage cassette to a data drive 150 or 160, and dispose that designated portable data storage cassette into the selected data drive.

Pass-through accessor 110 and pass-through accessor 120 comprise a processor 112 and 122, respectively, and computer readable medium 114 and 124, respectively, and instructions 116 and 126, respectively encoded in that computer readable medium 114 and 1.24, respectively. Processor 110 utilizes instructions 116 to implement Applicants' method utilizing pass-through accessor 110. Processor 120 utilizes instructions 126 to implement Applicants' method utilizing pass-through accessor 120.

Figure 1C:
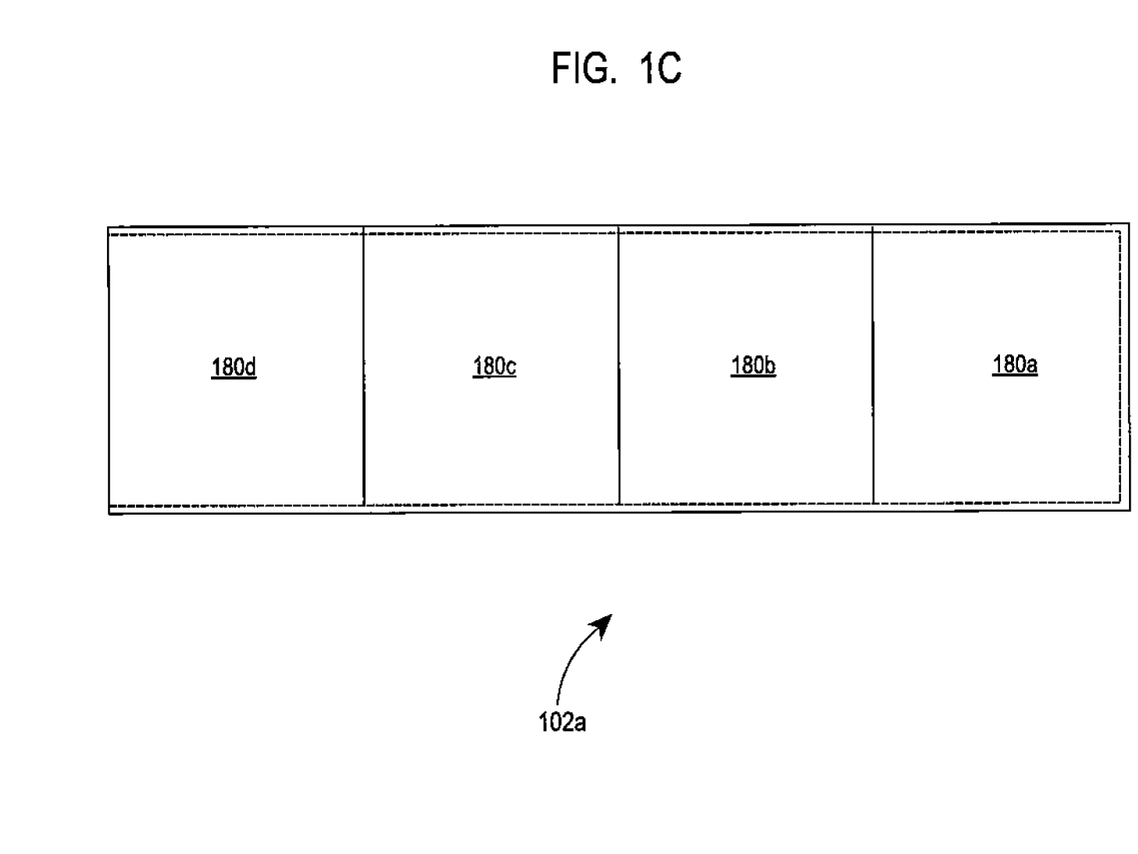
FIG. 1C is a block diagram showing a plurality of portable data storage cassettes removeably disposed within a storage slot disposed in the data storage library of FIG. 1A.

Referring now to FIG. 1C, in certain embodiments each storage slot in wall of storage slots 102 and/or wall of storage slots 104 can accommodate more than one portable data storage cassette. For example in the illustrated embodiment of FIG. 1C, four portable data storage cassettes, namely portable data storage cassettes 180a, 180b, 180c, and 180d, are shown disposed, one behind the other, in storage slot 102a.

If a host computer sends a write command and/or a read command (collectively an "I/O command") to data storage library 100, wherein that I/O command designates, for example, portable data storage cassette 180b. In order to access portable data storage cassette 180b, Applicants' pass-through accessor must first remove portable data storage cassette 180a from storage slot 102a, and then portable data storage cassette 180b can be removed from storage slot 102a and transported to a data storage device, such as data storage device 140 or 150.

Applicants' pass-through accessor 110 comprises fixturing apparatus 260, wherein fixturing apparatus 260 comprises a plurality of fixturing assemblies attached to a fixturing surface 262 and extending outwardly therefrom. In order to access and transport portable data storage cassette 180b, Applicants' method, using Applicants' pass-through accessor 110, first removes a portable data storage cassette 180a from storage slot 102a, pulls that portable data storage cassette into housing 270 through aperture front end 274, pushes the portable data storage cassette 180a outwardly through back end 276, and releaseably attaches portable data storage cassette 180a to a storage assembly disposed on storage apparatus 260. Pass-through accessor 110 can then retrieve portable data storage cassette 180b from storage slot 102a, and transport data storage cassette 180b to a designated data storage device.

Figure 3A:
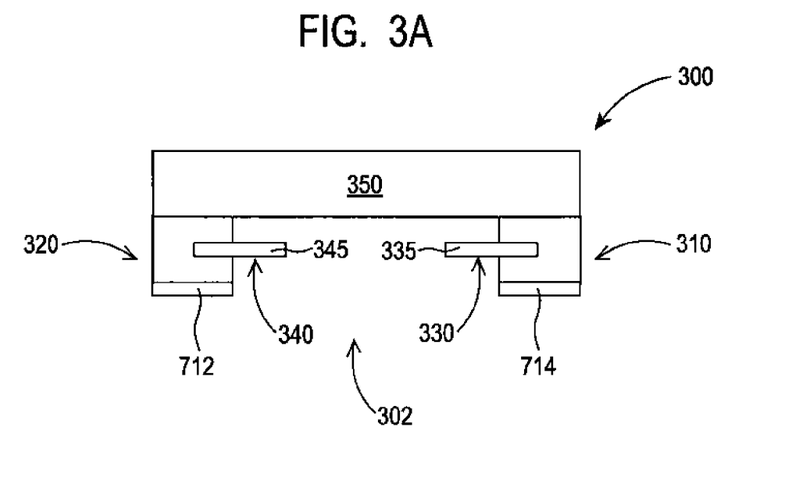
FIG. 3A illustrates one end of Applicants' gripper assembly moveably disposed within Applicants' pass-through accessor.

Referring now to FIG. 3A, Applicants' gripper assembly 300 comprises gripper mechanism 310 and gripper mechanism 320 disposed at a first end 302. Gripper mechanisms 310 and 320 are shown moveable disposed on rails 712 and 714, respectively. Cross-member 350 interconnects gripper mechanism 310 and gripper mechanism 320. Gripper mechanism 310 comprises gripper member 330, wherein gripper member 330 comprises distal end 335. Gripper mechanism 320 comprises gripper member 340, wherein gripper member 340 comprises distal end 345.

Figure 3B:
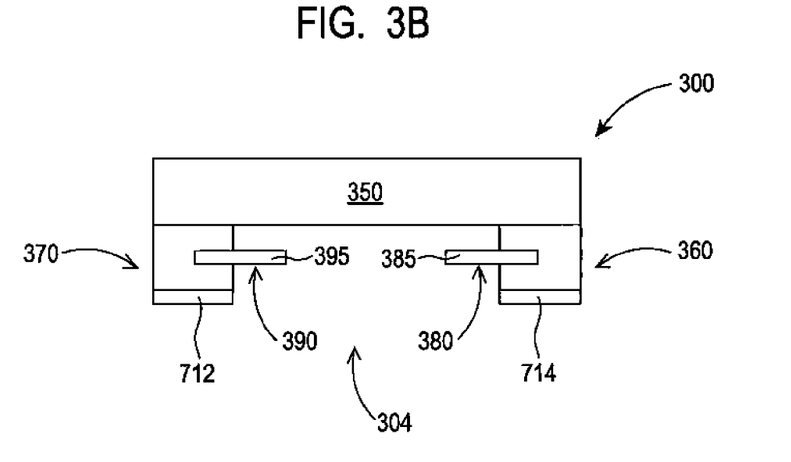
FIG. 3B illustrates an opposing end of Applicants' gripper assembly.

Referring now to FIG. 3B, Applicants' gripper assembly 300 comprises gripper mechanism 360 and gripper mechanism 370 disposed at a second end 304. Gripper mechanisms 370 and 360 are shown moveable disposed on rails 712 and 714, respectively. Gripper mechanism 360 comprises gripper member 380, wherein gripper member 380 comprises distal end 385. Gripper mechanism 370 comprises gripper member 390, wherein gripper member 390 comprises distal end 395.

Figure 2C:
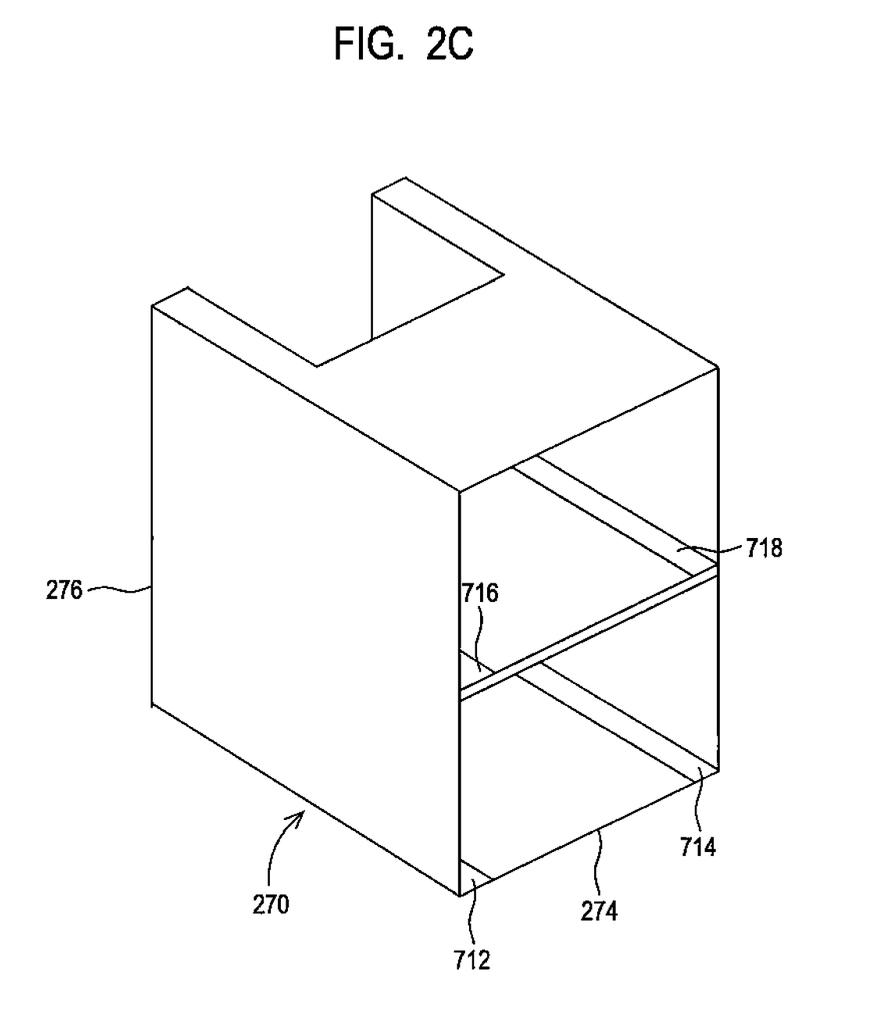
FIG. 2C illustrates a housing element of Applicants' pass-through accessor.

FIGS. 4, 5, 6, 7, 8, 9, 10, 11, and 12, illustrate Applicants' gripper assembly 300 moveably disposed within Applicants' pass-through accessor 110, and Applicants' method using pass-through accessor 110. Referring now to FIG. 2C, Applicants' pass-through accessor comprises a housing 270 with two sets of parallel rails disposed within housing 270 and extending outwardly from back end 276 of housing 270. A first set of parallel rails comprises rails 712 and 714. A second set of parallel rails comprises rails 716 and 718. For the sake of clarity,. FIGS. 4, 5, 6, 7, 8, 9, 10, 11, and 12, show Applicants' gripper mechanism 300 moveably disposed on rails 712 and 714. Applicants' a method illustrated in FIGS. 4, 5, 6, 7, 8, 9, 10, 11, and 12, can be performed using Applicants' gripper mechanism 300 moveably disposed on rails 716 and 718.

Figures 4, 5:
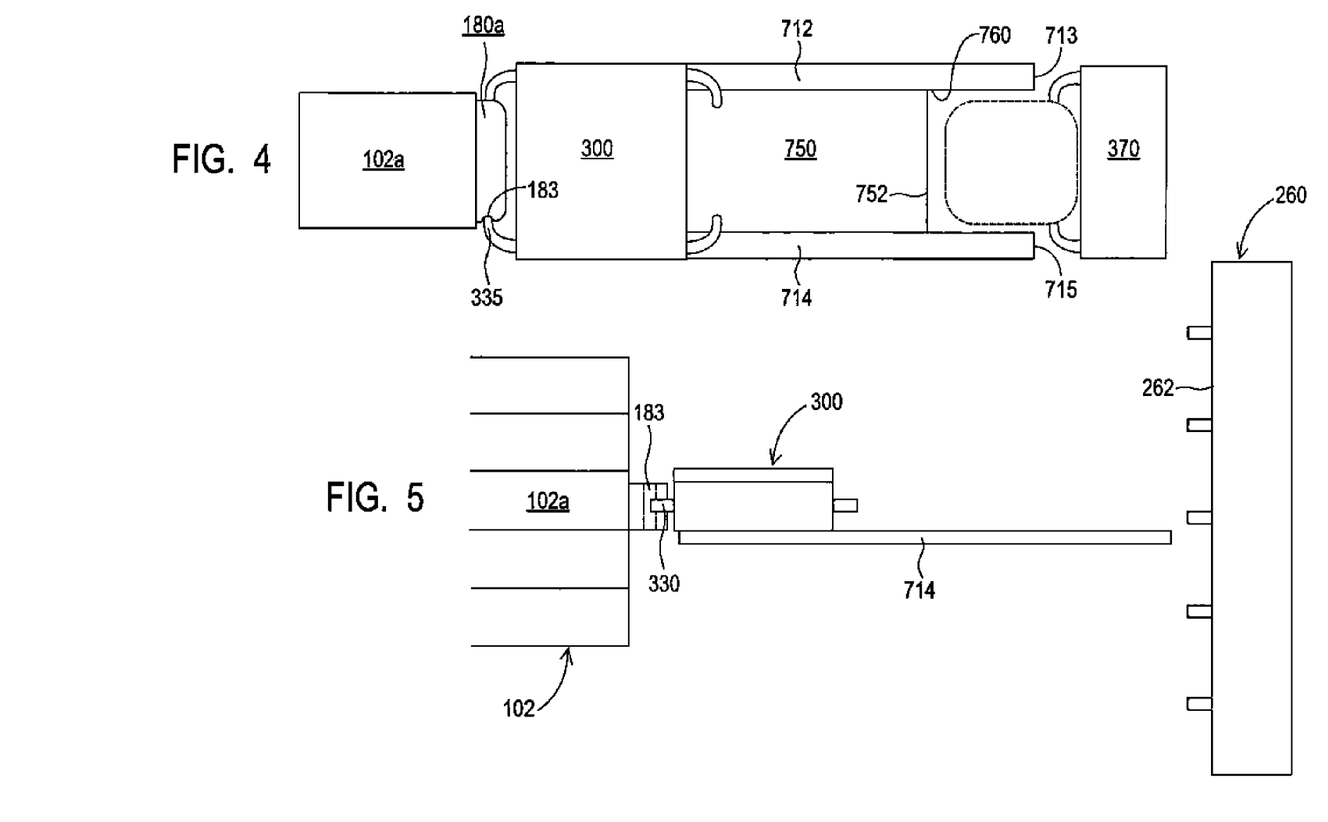
FIG. 4 shows a top view of Applicants' gripper assembly disposed at a first end of a set of parallel rails, wherein the gripper assembly comprises two sets of gripping members, and wherein a first set of gripping members are shown releaseably attached to a portable data storage cassette disposed in a storage slot.
FIG. 5 is a side view showing the elements of FIG. 4.

Referring to FIG. 4, floor 750 partially connects rail 712 and rail 714. The area of open space 760, defined by end 752 of floor 750, distal end 713 of rail 712, and distal end 715 of rail 714, is greater than the foot print of a portable data storage cassette 180 (shown in dotted lines) attached to, and extending outwardly from, fixturing assembly 370.

Figures 6, 7:
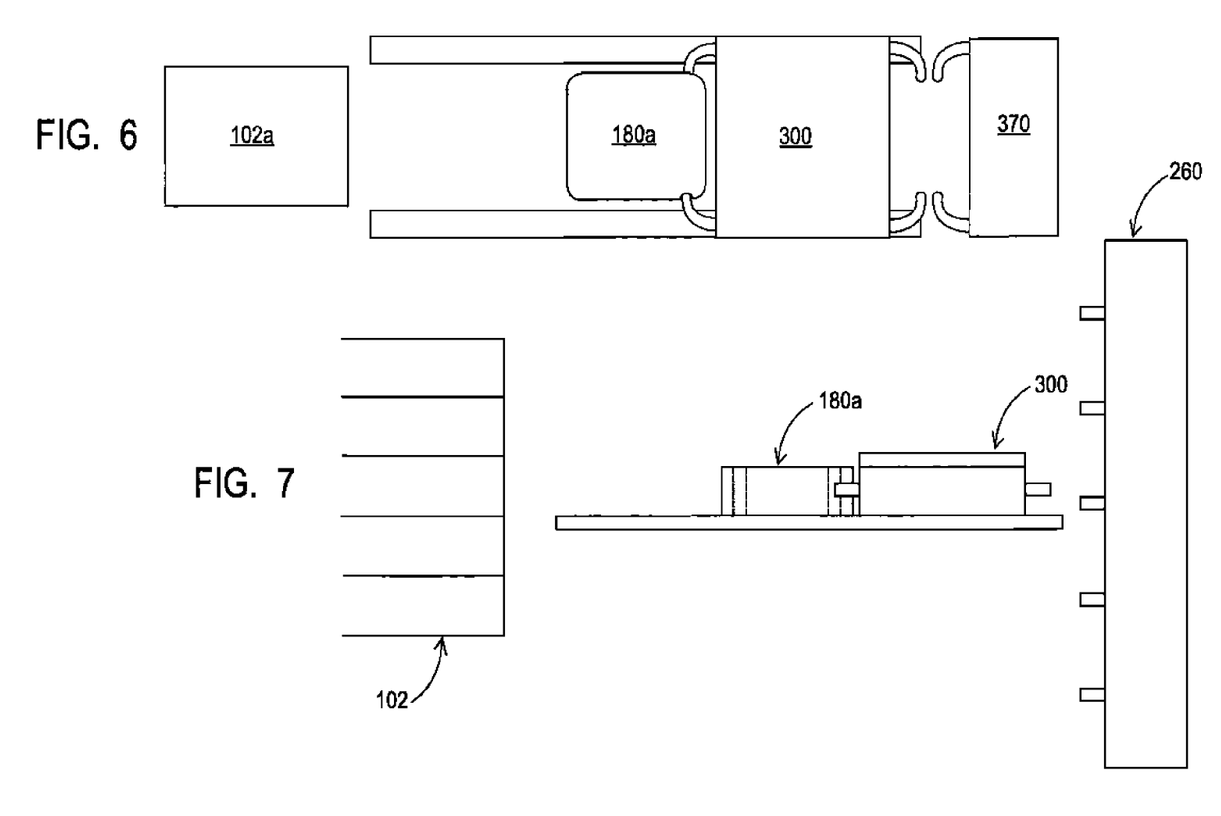
FIG. 6 is a top view showing Applicants' gripper assembly disposed at a second and opposing end of the set of parallel rails of FIG. 4.
FIG. 7 is a side view showing the elements of FIG. 6.
Figures 8, 9:
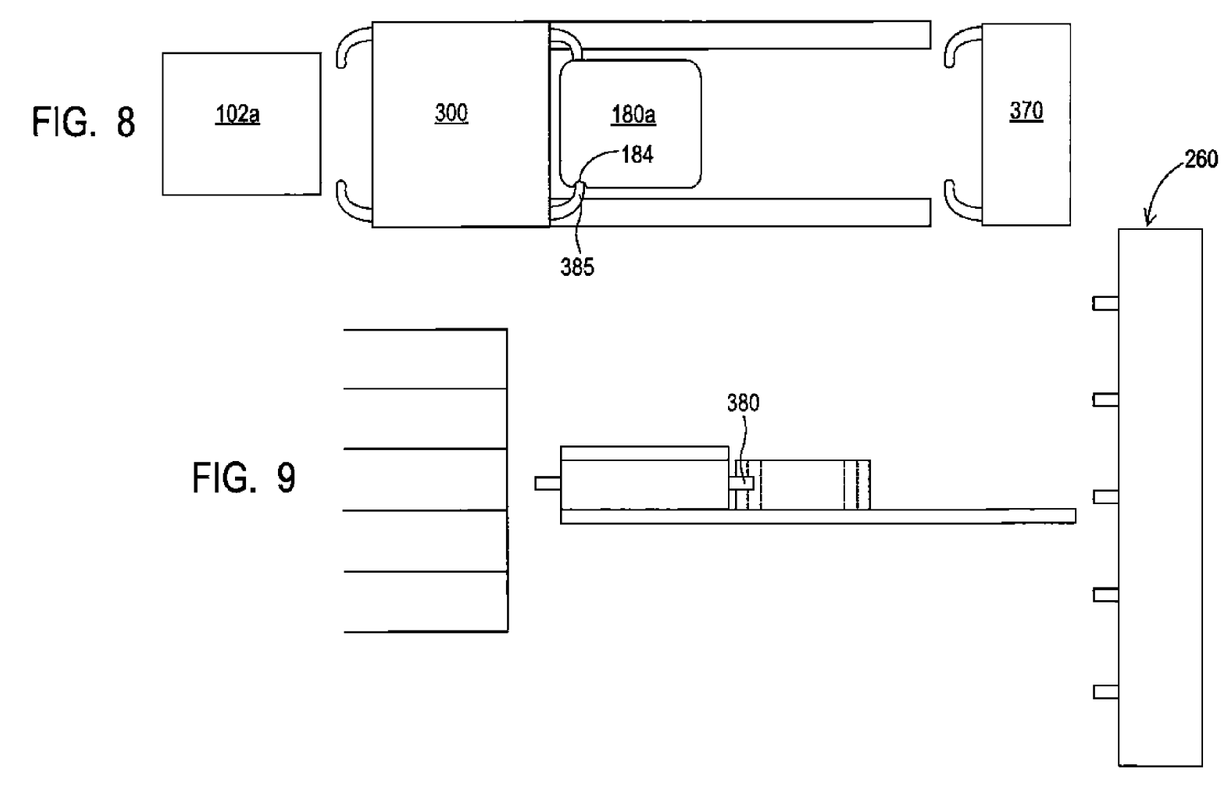
FIG. 8 shows the gripper assembly repositioned at the first end of the set of parallel rails with the second set of gripping members releaseably attached to the portable data storage cassette.
FIG. 9 is a side view showing the elements of FIG. 8.

FIGS. 4 and 5 show portable data storage cassette 180a removeably disposed in storage slot 102a. FIGS. 4 and 5 further show distal end 335 of gripping member 330 inserted into fixturing aperture/groove 183. Referring now to FIGS. 6 and 7, gripper assembly 300 pulls portable data storage cassette 180a outwardly from storage slot 102a, through front end 274, and into housing 270. Referring now to FIGS. 8 and 9, gripper assembly 300 then repositions itself such that distal end 385 of gripping member 380 is inserted into fixturing aperture/groove 184.

Figures 10, 11:
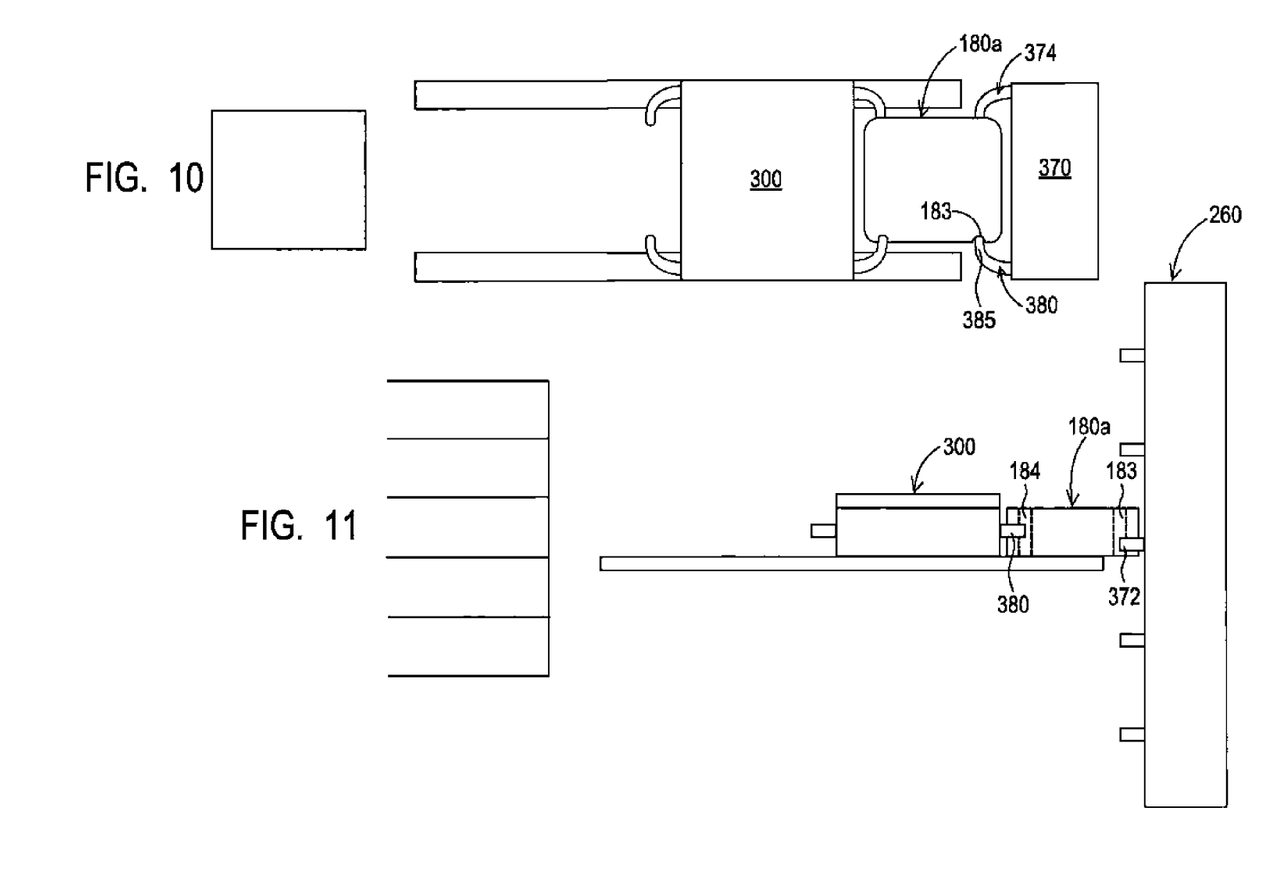
FIG. 10 shows the portable data storage cassette releaseably attached to Applicants' gripper assembly using the second set of gripping members and to a fixturing assembly disposed on a fixturing apparatus element of Applicants' pass-through accessor.
FIG. 11 is a side view showing the elements of FIG. 10.

Referring now to FIGS. 10 and 11, gripper assembly 300 pushes portable data storage cassette 180a outwardly through back end 276 of housing 270 until portable data storage cassette 180a is attached to fixturing assembly 370 disposed on fixturing apparatus 260. FIGS. 10 and 11, show distal end 385 of gripping member 380 inserted into fixturing aperture 1 groove 183 formed in housing 181 portion of portable data storage cassette 180a.

Figure 12:
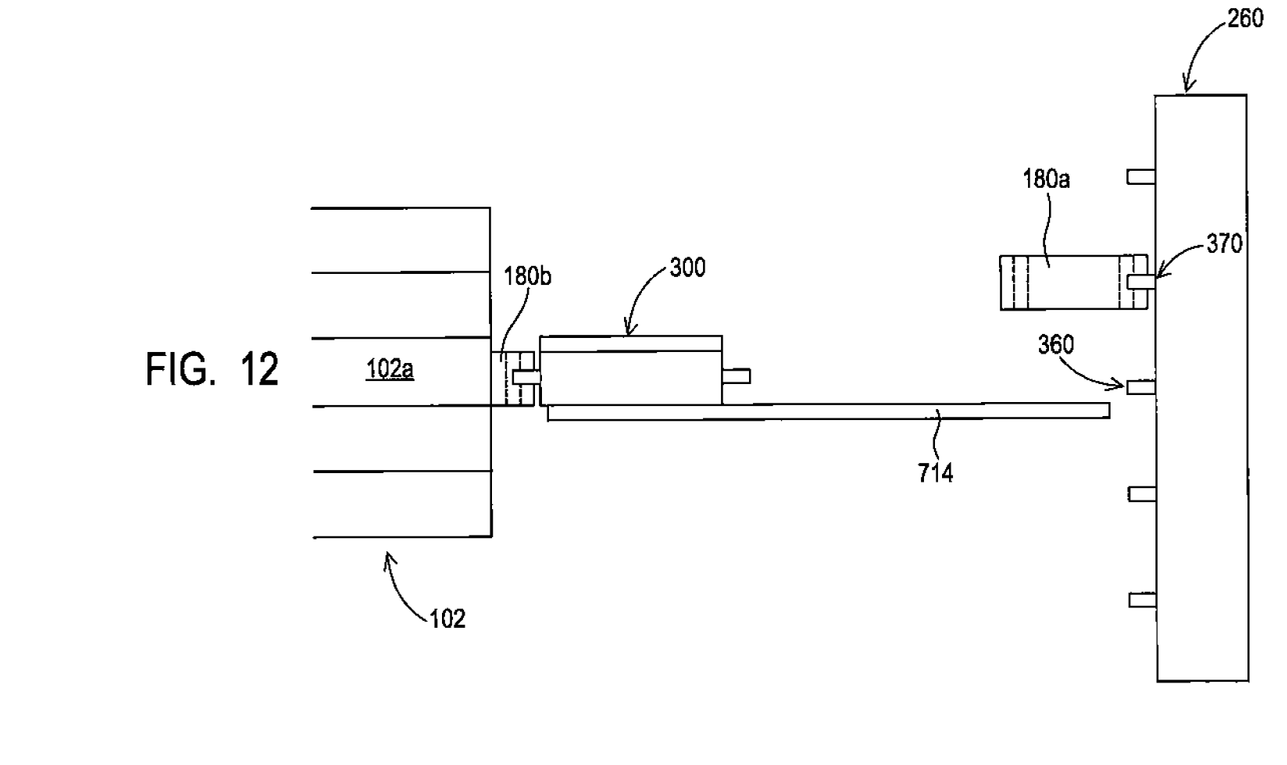
FIG. 12 shows the fixturing apparatus of FIG. 10 having been moved upwardly, and the gripper assembly releaseably attached to another portable data storage cassette disposed within the storage slot of FIG. 4.

FIG. 12 shows portable data storage cassette 180a attached to fixturing assembly 370. FIG. 12 further shows that fixturing apparatus 260 has been moved upwardly such that fixturing assembly 360 is positioned adjacent rails 714. FIG. 12 further shows that gripper assembly 300 is releaseably attached to portable data cassette 180b. Each iteration of Applicants' method illustrated by FIGS. 4, 5, 6, 7, 8, 9, 10, 11 and 12, removes a portable data storage cassette from a storage slot, such as storage slot 102a, passes that portable data storage cassette through housing 270, and stores that retrieved portable data storage cassette on fixturing apparatus 260.

In certain embodiments, Applicants' invention includes instructions, such as instructions 196 (FIG. 1) and/or instructions 116 (FIG. 1), and/or instructions 126 (FIG. 1), encoded in a computer readable medium, such as computer readable medium 192 (FIG. 1) and/or 114 (FIG. 1), and/or 124 (FIG. 1), where those instructions are executed by a processor, such as processor 191 (FIG. 1), and/or 112 (FIG. 1), and/or 122 (FIG. 1), to implement Applicants' method utilizing Applicants' pass-through accessor.

In other embodiments, Applicants' invention includes instructions residing in any other computer program product, where those instructions are executed by a processor external to, or internal to, data storage system 100, to perform Applicants' method utilizing Applicants' pass-through accessor. In either case, the instructions may be encoded in a computer readable medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compact flash, smart media, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A pass-through accessor moveably disposed in a data storage library, comprising:
    a lifting servo section;
    a housing disposed on said lifting servo section, wherein said housing is formed to include an open front and an open back end;
    a first set of parallel rails disposed within said housing and extending outwardly from said back end of said housing;
    a first gripper assembly moveably disposed on said first set of parallel rails, wherein said first gripper assembly comprises a first end, an opposing second end, a first gripping mechanism disposed on said first end, and a second gripping mechanism disposed on said second end;
    a vertical pillar comprising a first end and an opposing second;
    wherein said lifting servo section is moveably disposed on said vertical pillar, and wherein said first end of said vertical pillar is attached to a carriage assembly moveably disposed in said data storage library;
    a fixturing apparatus comprising a first end, a second end, and a plurality of fixturing assemblies;
    wherein:
    said first end of said fixturing apparatus is attached to said vertical pillar adjacent said first end of said vertical pillar;
    said second end of said fixturing apparatus is attached to said vertical pillar adjacent said second end of said vertical pillar;
    said fixturing apparatus can be moved upwardly and downwardly along said vertical pillar;
    said fixturing assembly is rotationally attached to said vertical pillar.

2. The pass-through accessor of claim 1, further comprising:
    a second set of parallel rails disposed within said housing and extending outwardly from said back end of said housing;
    a second gripper assembly moveably disposed on said second set of parallel rails, wherein said second gripper assembly comprises a third end, an opposing fourth end, a third gripping mechanism disposed on said third end, and a fourth gripping mechanism disposed on said fourth end.

3. The pass-through accessor of claim 1, wherein said fixturing apparatus is disposed adjacent said rear end of said housing.

4. The pass-through accessor of claim 3, wherein said data storage library comprises a plurality of storage slots and a plurality of portable data storage cassettes removeably disposed within said plurality of storage slots, wherein:
    said lifting servo section can be positioned adjacent a storage slot;
    said first gripping mechanism can be releaseably attached to a first end of a portable data storage cassette disposed in said storage slot;
    said gripper assembly can pull said portable data storage cassette outwardly from said storage slot and into said housing through said aperture;
    said second gripping mechanism can be releaseably attached to a second end of said portable data storage cassette; and said gripper assembly can push said portable data storage cassette outwardly from said rear end of said housing and into a fixturing assembly disposed on said fixturing surface.

5. A data storage library comprising:
a pass-through accessor moveably disposed therein, wherein said pass-through accessor comprises:
a lifting servo section;
a housing disposed on said lifting servo section, wherein said housing is formed to include an open front and an open back end;
a first set of parallel rails disposed within said housing and extending outwardly from said back end of said housing;
a first gripper assembly moveably disposed on said first set of parallel rails, wherein said first gripper assembly comprises a first end, an opposing second end, a first gripping mechanism disposed on said first end, and a second gripping mechanism disposed on said second end
a vertical pillar comprising a first end and an opposing second;
wherein said lifting servo section is moveably disposed on said vertical pillar, and wherein said first end of said vertical pillar is attached to a carriage assembly moveably disposed in said data storage library;
a fixturing apparatus comprising a first end, a second end, and a plurality of fixturing assemblies;
wherein:
said first end of said fixturing apparatus is attached to said vertical pillar adjacent said first end of said vertical pillar;
said second end of said fixturing apparatus is attached to said vertical pillar adjacent said second end of said vertical pillar;
said fixturing apparatus can be moved upwardly and downwardly along said vertical pillar;
said fixturing assembly is rotationally attached to said vertical pillar.

6. The data storage library of claim 5, wherein said pass-through accessor further comprises:
a second set of parallel rails disposed within said housing and extending outwardly from said back end of said housing;
a second gripper assembly moveably disposed on said first set of parallel rails, wherein said second gripper assembly comprises a third end, an opposing fourth end, a third gripping mechanism disposed on said third end, and a fourth gripping mechanism disposed on said fourth end.

7. The data storage library of claim 5, wherein said pass-through accessor further comprises:
a housing disposed on said lifting servo section, wherein said housing comprises a front end formed to include an aperture extending therethrough and an rear end;
wherein said gripper assembly is disposed within said housing; and
wherein said fixturing apparatus is disposed adjacent said rear end of said housing.

8. The data storage library of claim 7, further comprising a plurality of storage slots and a plurality of portable data storage cassettes removeably disposed within said plurality of storage slots, wherein:
said lifting servo section can be positioned adjacent a storage slot;
said first gripping mechanism can be releaseably attached to a first end of a portable data storage cassette disposed in said storage slot;
said gripper assembly can pull said portable data storage cassette outwardly from said storage slot and into said housing through said aperture;
said second gripping mechanism can be releaseably attached to a second end of said portable data storage cassette;
said gripper assembly can push said portable data storage cassette outwardly from said rear end of said housing and into a fixturing assembly disposed on said fixturing apparatus.

9. A method to access a plurality of portable data storage cassettes from a storage slot disposed in a data storage library comprising and a pass-through accessor moveably disposed therein, wherein said pass-through accessor comprises:
a lifting servo section;
a housing disposed on said lifting servo section, wherein said housing is formed to include an open front and an open back end;
a first set of parallel rails disposed within said housing and extending outwardly from said back end of said housing;
a first gripper assembly moveably disposed on said first set of parallel rails, wherein said first gripper assembly comprises a first end, an opposing second end, a first gripping mechanism disposed on said first end, and a second gripping mechanism disposed on said second end;
a vertical pillar comprising a first end and an opposing second;
wherein said lifting servo section is moveably disposed on said vertical pillar, and wherein said first end of said vertical pillar is attached to a carriage assembly moveably disposed in said data storage library;
a fixturing apparatus comprising a first end, a second end, and a plurality of fixturing assemblies;
wherein:
said first end of said fixturing apparatus is attached to said vertical pillar adjacent said first end of said vertical pillar;
said second end of said fixturing apparatus is attached to said vertical pillar adjacent said second end of said vertical pillar;
said fixturing apparatus can be moved upwardly and downwardly along said vertical pillar;
said fixturing assembly is rotationally attached to said vertical pillar;
wherein said method comprises:
removing by said first gripper assembly a first portable data storage cassette from said storage slot;
storing by said first gripper assembly said first portable data storage cassette in a fixturing apparatus disposed on said pass-through accessor;
removing by said first gripper assembly a second portable data storage cassette from said storage slot.

10. The method of claim 9, wherein said pass-through accessor further comprises:
a second set of parallel rails disposed within said housing and extending outwardly from said back end of said housing;
a second gripper assembly moveably disposed on said second set of parallel rails, wherein said second gripper assembly comprises a third end, an opposing fourth end, a third gripping mechanism disposed on said third end, and a fourth gripping mechanism disposed on said fourth end.

11. A pass-through accessor moveably disposed in a data storage library comprising:

a computer readable medium comprising computer readable code disposed therein;
a lifting servo section;
a housing disposed on said lifting servo section, wherein said housing is formed to include an open front and an open back end;
a first set of parallel rails disposed within said housing and extending outwardly from said back end of said housing;
a first gripper assembly moveably disposed on said first set of parallel rails, wherein said first gripper assembly comprises a first end, an opposing second end, a first gripping mechanism disposed on said first end, and a second gripping mechanism disposed on said second end
a fixturing apparatus comprising a first end, a second end, and a plurality of fixturing assemblies;
a vertical pillar comprising a first end and an opposing second;
wherein said lifting servo section is moveably disposed on said vertical pillar, and wherein said first end of said vertical pillar is attached to a carriage assembly moveably disposed in said data storage library;
a fixturing apparatus comprising a first end, a second end, and a plurality of fixturing assemblies;
wherein:
said first end of said fixturing apparatus is attached to said vertical pillar adjacent said first end of said vertical pillar;
said second end of said fixturing apparatus is attached to said vertical pillar adjacent said second end of said vertical pillar;
said fixturing apparatus can be moved upwardly and downwardly along said vertical pillar;
said fixturing assembly is rotationally attached to said vertical pillar;
said computer readable program code comprising a series of computer readable program steps to effect:
removing by said first gripper assembly a first portable data storage cassette from said storage slot;
storing by said first gripper assembly said first portable data storage cassette in said fixturing apparatus;
removing by said first gripper assembly a second portable data storage cassette from said storage slot.

12. The pass-through accessor of claim 11, further comprising:
a second set of parallel rails disposed within said housing and extending outwardly from said back end of said housing;
a second gripper assembly moveably disposed on said second set of parallel rails, wherein said second gripper assembly comprises a third end, an opposing fourth end, a third gripping mechanism disposed on said third end, and a fourth gripping mechanism disposed on said fourth end.

* * * * *